(12) United States Patent
Nakamoto et al.

(10) Patent No.: US 11,037,383 B2
(45) Date of Patent: Jun. 15, 2021

(54) VEHICLE MOUNTED DEVICE, CONTROL METHOD, AND PROGRAM

(71) Applicant: MITSUBISHI HEAVY INDUSTRIES MACHINERY SYSTEMS, LTD., Kobe (JP)

(72) Inventors: Hiromichi Nakamoto, Tokyo (JP); Naruhisa Kameo, Tokyo (JP); Hiroyuki Nakayama, Tokyo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 0 days.

(21) Appl. No.: 16/757,528

(22) PCT Filed: Oct. 31, 2017

(86) PCT No.: PCT/JP2017/039327
§ 371 (c)(1),
(2) Date: Apr. 20, 2020

(87) PCT Pub. No.: WO2019/087297
PCT Pub. Date: May 9, 2019

(65) Prior Publication Data
US 2020/0349780 A1 Nov. 5, 2020

(51) Int. Cl.
*B60W 10/00* (2006.01)
*G07C 5/08* (2006.01)
*B60W 50/04* (2006.01)
*G05D 1/02* (2020.01)

(52) U.S. Cl.
CPC ......... *G07C 5/0841* (2013.01); *B60W 50/045* (2013.01); *G05D 1/0278* (2013.01); *B60W 2050/046* (2013.01)

(58) Field of Classification Search
CPC .................................. B60W 10/00; G01C 1/00
See application file for complete search history.

(56) References Cited

U.S. PATENT DOCUMENTS

| 2012/0105637 A1* | 5/2012 | Yousefi | H04L 69/22 |
| | | | 348/148 |
| 2015/0205619 A1 | 7/2015 | Kato | |
| 2019/0118588 A1* | 4/2019 | Lesesky | B60C 23/20 |

FOREIGN PATENT DOCUMENTS

JP   2015-156205 A   8/2015

OTHER PUBLICATIONS

PCT/ISA/210, "International Search Report for International Application No. PCT/JP2017/039327," dated Jan. 9, 2018.
PCT/ISA/237, "Written Opinion of the International Searching Authority for International Application No. PCT/JP2017/039327," dated Jan. 9, 2018.

* cited by examiner

*Primary Examiner* — Shirley Lu
(74) *Attorney, Agent, or Firm* — Manabu Kanesaka; Benjamin Hauptman; Kenneth Berner

(57) ABSTRACT

A vehicle mounted device (10) includes a positional information acquisition unit (110) configured to acquire current positional information when a stop is detected, a snapshot selection unit (111) configured to select one of a plurality of snapshots, recorded in a state in which a part of a plurality of functions are executable, on the basis of the acquired current positional information, and a registration unit (112) configured to register the selected snapshot as a snapshot to be read upon the next boot-up.

6 Claims, 6 Drawing Sheets

FIG. 4

<SNAPSHOT TABLE 130>

| SNAPSHOT | TARGET AREA | PRIORITY |
|---|---|---|
| SNAPSHOT 1 | SNAPSHOT 1 AREA 1 (VICINITY OF ROAD CHARGING AREA) | 1 |
| SNAPSHOT 2 | SNAPSHOT 2 AREA 2 (PARKING LOT) | 2 |
| SNAPSHOT 3 | SNAPSHOT 3 AREA 3 (ROADSIDE ZONE, PARKING PROHIBITED AREA) | 3 |
| SNAPSHOT 4 | SNAPSHOT 4 AREA 4 (OTHER) | 4 |

VEHICLE MOUNTED DEVICE, CONTROL METHOD, AND PROGRAM

RELATED APPLICATIONS

The present application is National Phase of International Application No. PCT/JP2017/039327 filed Oct. 31, 2017, the disclosure of which is hereby incorporated by reference herein in its entirety.

TECHNICAL FIELD

The present invention relates to a vehicle mounted device, a control method, and a program.

BACKGROUND ART

As a technology of suspending and resuming a system of an electronic device, for example, a hibernation function is known. The hibernation function is a function of storing a snapshot image captured at the time of receiving a system suspension request in a non-volatile storage device, and restoring the state before system suspension by transferring the snapshot image to a memory upon the next boot-up (refer to, for example, Patent Literature 1).

CITATION LIST

Patent Literature

[Patent Literature 1]
Japanese Unexamined Patent Application, First Publication No. 2015-156205

SUMMARY OF INVENTION

Technical Problem

For example, an electronic device such as a vehicle mounted device performs wireless communication with a roadside communication device installed at a tollgate on a toll road, an entrance of a parking lot, and the like using an electronic toll collection system (ETC (registered trademark), also referred to as an "automatic toll collection system"), and thereby payment of usage fees of these facilities can be automatically performed.

In addition, in recent years, a technology of transmitting or receiving information necessary for controlling vehicles in violation of parking or the like by performing wireless communication between a vehicle mounted device and a violation control system that controls the vehicles in violation is considered.

When a vehicle passes through a communication region with a roadside communication device of the electronic toll collection system immediately after an engine of the vehicle starts, when it is necessary to respond to a call from the violation control system even if the engine is stopped, and the like, the vehicle mounted device is required to be booted in a short period of time and to be in a state in which various types of processing are executable.

However, when the vehicle mounted device is booted using a conventional hibernation function, since it takes more time to transfer data to a memory if a data size of a snapshot image is large, it may be difficult to shorten boot-up time. As a result, the vehicle mounted device may not able to perform processing of paying a usage fee, processing of communicating with the violation control system, processing of transmitting traveling information to the operation management system, and the like normally in some cases.

Solution to Problem

The present invention has adopted the following means to solve the problems described above.

According to a first aspect of the present invention, a vehicle mounted device (10) includes a positional information acquisition unit (110) configured to acquire current positional information when a stop is detected, a snapshot selection unit (111) configured to select one of a plurality of snapshots, recorded in a state in which a part of a plurality of functions are executable, on the basis of the acquired current positional information, and a registration unit (112) configured to register the selected snapshot as a snapshot to be read upon the next boot-up.

When a vehicle stops in the vicinity of a specific area, the vehicle may pass through the specific area immediately after the engine starts. For this reason, the vehicle mounted device may be required to be immediately booted to enable functions required for the specific area upon the next boot-up according to a current position. In such a case, the vehicle mounted device according to the aspect described above can select and register a small-capacity snapshot recorded in a state in which only functions of a part of the plurality of snapshots are executable. As a result, since the vehicle mounted device can be booted only by reading the small-capacity snapshot upon the next boot-up, it is possible to shorten the boot-up time as compared to the boot-up in a state in which all functions are executable.

According to a second aspect of the present invention, in the vehicle mounted device (10) according to the first aspect, each of the plurality of snapshots is associated with a different area, and is recorded in a state in which functions with high priorities to be executed in the area are executable among the plurality of functions, and the snapshot selection unit (111) selects a snapshot associated with an area including the current positional information.

In this manner, the vehicle mounted device can be booted in a state in which only minimum required functions with high priorities to be executed at a current position are executable by reading the registered snapshot. As a result, since the vehicle mounted device can postpone execution preparation of functions with low priorities to be executed at the current position, it is possible to further shorten the boot-up time.

According to a third aspect of the present invention, in the vehicle mounted device (10) according to the second aspect, a function that has a high possibility to be executed in the area among the plurality of functions is set with a higher priority than other functions.

In this manner, since the vehicle mounted device is booted in a state in which only function that has a possibility to be executed at the current position is executable, and the execution preparation of functions that have a low possibility to be executed at the current position can be postponed, it is possible to further shorten the boot-up time.

According to a fourth aspect of the present invention, in the vehicle mounted device (10) according to the second or third aspect, the plurality of snapshots are set with different priorities in advance, and the snapshot selection unit (111) selects a snapshot on the basis of the priority when the current positional information is included in a plurality of areas.

In this manner, the snapshot selection unit can select an appropriate snapshot according to a priority even when the current positional information is included in the plurality of areas. As a result, it is possible to reduce a possibility of processing of functions with high priorities failing.

According to a fifth aspect of the present invention, a control method includes a positional information acquisition step of acquiring current positional information when a stop is detected, a snapshot selection step of selecting one of a plurality of snapshots, recorded in a state in which a part of a plurality of functions are executable, on the basis of the acquired current positional information, and a registration step of registering the selected snapshot as a snapshot to be read upon the next boot-up.

According to a sixth aspect of the present invention, a program causes a computer of a vehicle mounted device to execute a positional information acquisition step of acquiring current positional information when a stop is detected, a snapshot selection step of selecting one of a plurality of snapshots, recorded in a state in which a part of a plurality of functions are executable, on the basis of the acquired current positional information, and a registration step of registering the selected snapshot as a snapshot to be read upon the next boot-up.

Advantageous Effects of Invention

According to the vehicle mounted device, the control method, and the program described above, it is possible to shorten boot-up time.

BRIEF DESCRIPTION OF DRAWINGS

FIG. 4 is a diagram which shows an example of a snapshot table according to the embodiment of the present invention.

DESCRIPTION OF EMBODIMENTS

Hereinafter, a vehicle mounted device according to one embodiment of the present invention will be described with reference to FIGS. 1 to 7.

Outline of Vehicle Mounted Device

Figure 1:
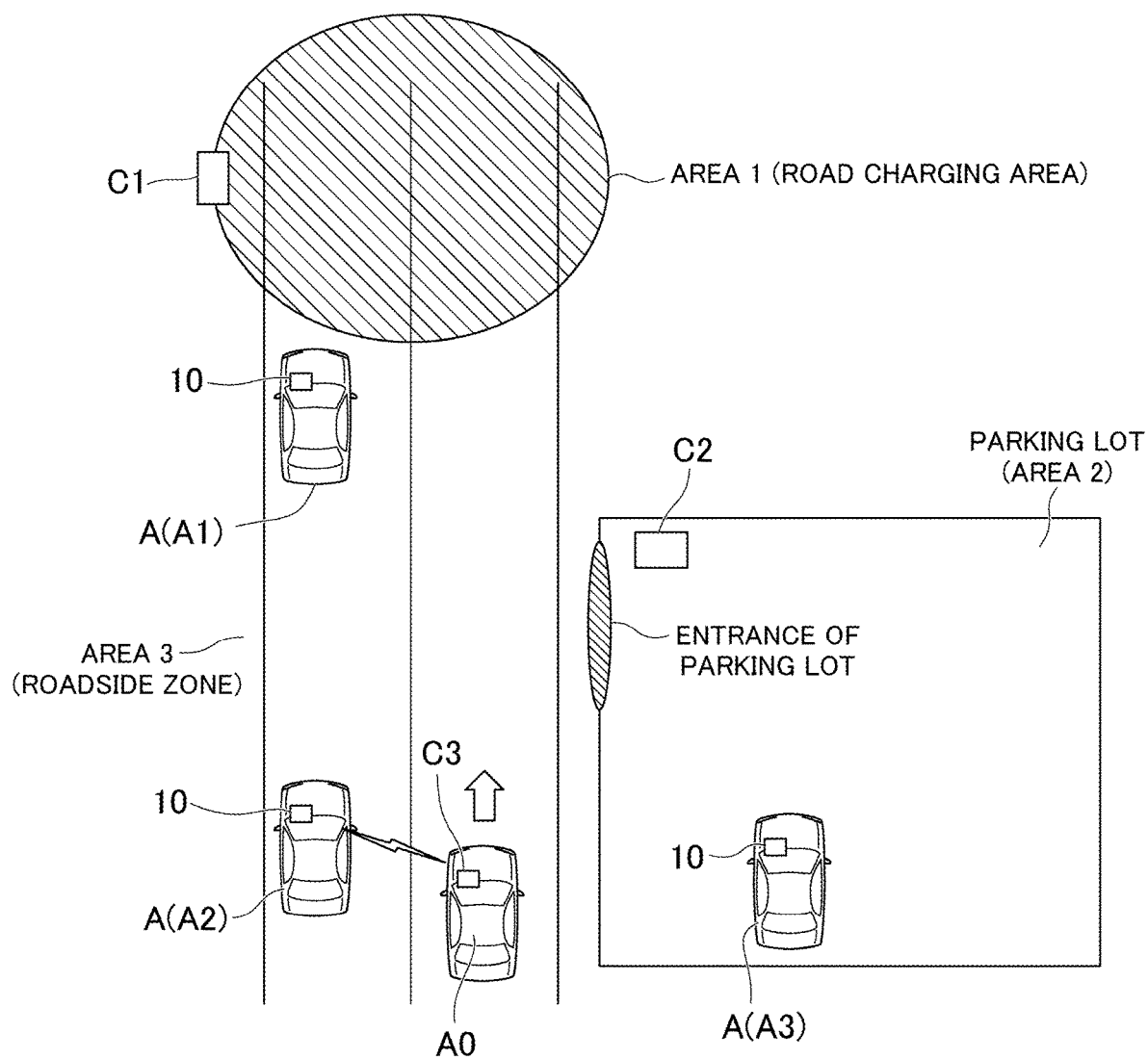
FIG. 1 is a diagram for describing an outline of a vehicle mounted device according to one embodiment of the present invention.

FIG. 1 is a diagram for describing an outline of the vehicle mounted device according to the embodiment of the present invention.

As shown in FIG. 1, a vehicle mounted device 10 is mounted in each of a plurality of vehicles A (A1, A2, A3, . . . , and so forth).

The vehicle mounted device 10 according to the present embodiment includes, for example, a "toll payment function" for paying a usage fee (a toll) of a road charging area such as a toll road, a "parking fee payment function" for paying a usage fee (a parking fee) of a parking lot, a "violation control response function" for responding to a violation control system, and the like.

As the "toll payment function," the vehicle mounted device 10 transmits or receives various types of information (hereinafter, also referred to as "charging information") required for a toll payment by performing wireless communication based on a dedicated short range communication (DSRC) technology with a wireless communication device C1 provided at the entrance of the road charging area in a predetermined frequency band.

The charging information includes, for example, a vehicle mounted device ID that can specify the vehicle mounted device 10, a vehicle type classification of a vehicle A in which the vehicle mounted device 10 is mounted, and information such as a card number and expiration date of an IC card (a credit card or the like) used for a toll payment.

In addition, the toll payment function is configured of one or more tasks. The toll payment function in the present embodiment is configured of at least a "communication task for a toll" for communicating with the wireless communication device C1 and a "card processing task" for reading and writing on an IC card.

In addition, as the "parking fee payment function," the vehicle mounted device 10 transmits or receives the "charging information" (a vehicle mounted device ID, a vehicle type classification, a card number, an expiration date, and the like) required for payment of a parking fee by performing wireless communication based on the DSRC technology with a wireless communication device C2 provided at the entrance of a parking lot in a predetermined frequency band. Like the toll payment function, the charging information includes information such as the vehicle mounted device ID, the vehicle type classification, the card number, and the expiration date.

Moreover, the parking fee payment function is configured of one or more tasks. The parking fee payment function in the present embodiment is configured of at least a "communication task for a parking fee" for communicating with the wireless communication device C2 and a "card processing task" for reading and writing on an IC card.

Furthermore, as the "violation control response function," the vehicle mounted device 10 transmits and receives "vehicle information" (a vehicle mounted device ID, a vehicle type classification, and the like) that includes information on the vehicle A (and the vehicle mounted device 10 thereof) to and from the violation control system by performing wireless communication based on the DSRC technology with a wireless communication device C3 in a predetermined frequency band.

In addition, the violation control response function is configured of one or more tasks. The violation control response function in the present embodiment is configured of at least a "communication task for violation control response" for communicating with the wireless communication device C3.

Note that, in the present embodiment, an aspect in which the wireless communication device C3 of the violation control system is mounted on a patrol vehicle A0 will be described as shown in FIG. 1. When the patrol vehicle A0 approaches a vehicle A2, the wireless communication device C3 requests the vehicle mounted device 10 to transmit vehicle information. If the vehicle mounted device 10 receives a transmission request of vehicle information, the vehicle mounted device 10 transmits vehicle information of the vehicle A2 (and the vehicle mounted device 10 thereof) to the wireless communication device C3 using the "communication task for violation control response."

Then, a monitoring person in the patrol vehicle A0 controls parking violation or the like of the vehicle A2 based on the vehicle information received by the wireless communication device C3. In addition, when the vehicle type classification of the vehicle A2 included in the vehicle information is different from a visually confirmed vehicle type classification of the vehicle A2, the monitoring person determines that the vehicle mounted device 10 has been improperly replaced, and deals with misconduct related to the vehicle A2.

In addition, the vehicle mounted device 10 is powered off when an engine of the vehicle A is stopped while the vehicle A is stopped in a roadside zone or a parking lot. At this time, the vehicle mounted device 10 starts boot-up processing with starting of the engine of the vehicle A or a communication start request transmitted from the violation control system using a predetermined wireless communication technology (for example, Bluetooth (registered trademark), an optical wireless communication, or the like) as a trigger.

Note that it is assumed that, when the vehicle mounted device 10 is powered off, only a wireless communication unit (not shown) for receiving a communication start request from the violation control system stands by in a state in which it is ready to start processing independently from the CPU 11. Then, the wireless communication device C3 transmits the communication start request to the vehicle mounted device 10 using a predetermined communication technology in consideration of a case in which the vehicle mounted device 10 is powered off. In this manner, the vehicle mounted device 10 performs its own boot-up processing with the communication start request as a trigger, and starts wireless communication using the DSRC after the "communication task for violation control response" is ready to start processing.

As described above, when the vehicle A is positioned in the vicinity of any one of the wireless communication devices C1 to C3, since the vehicle mounted device 10 may immediately communicate with the wireless communication devices C1 to C3, it is required to minimize the boot-up time. For this reason, the vehicle mounted device 10 according to the present embodiment has a functional constituent for realizing high-speed boot-up that will be described below.

Functional Constituent of Vehicle Mounted Device

Figure 2:
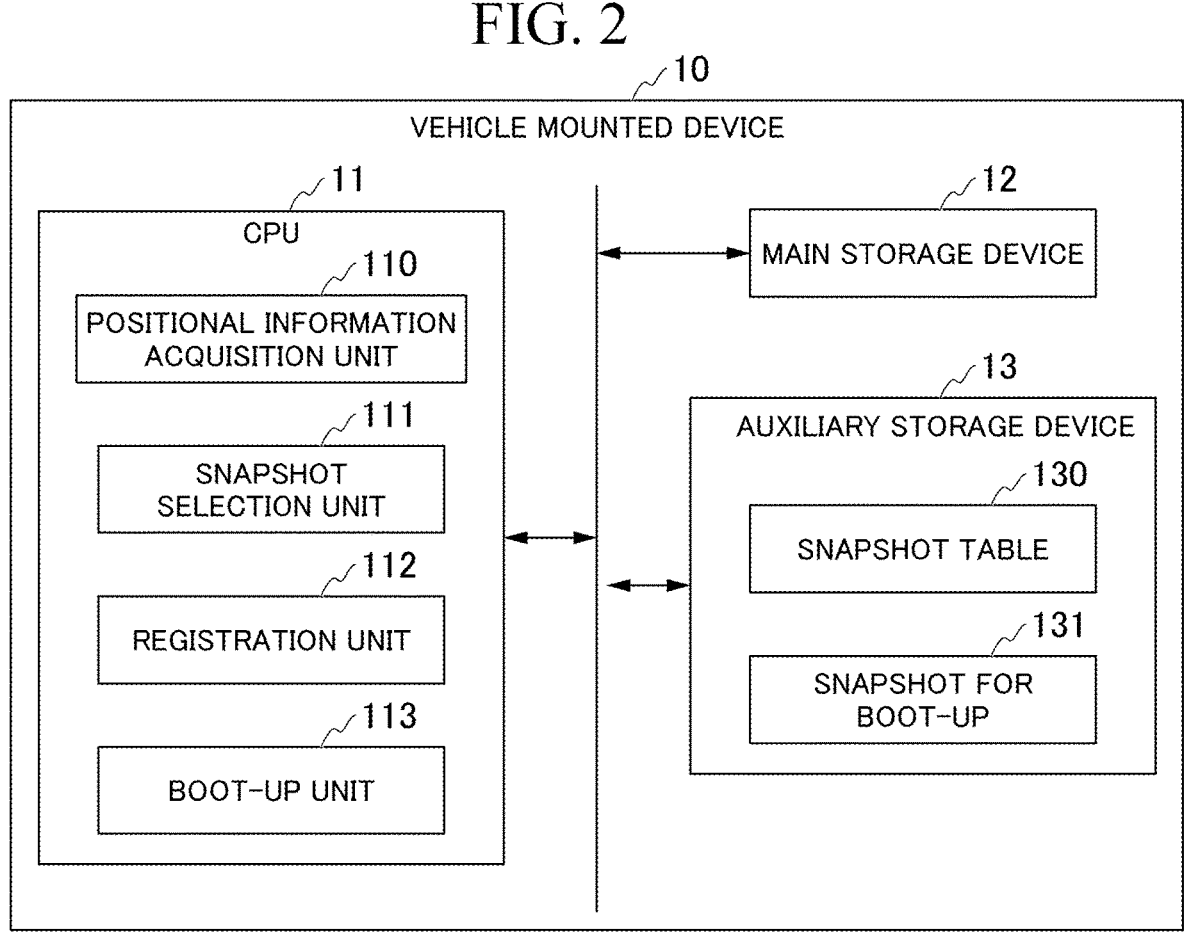
FIG. 2 is a diagram which shows functional constituents of the vehicle mounted device according to the embodiment of the present invention.

FIG. 2 is a diagram which shows functional constituents of the vehicle mounted device according to one embodiment of the present invention.

As shown in FIG. 2, the vehicle mounted device 10 includes a CPU 11, a main storage device 12, and an auxiliary storage device 13.

The CPU 11 is a processor that controls an entire operation of the vehicle mounted device 10, loads a predetermined program stored in the auxiliary storage device 13 in advance into the main storage device 12, and operates according to the program. As a result, the CPU 11 exhibits the functions of a positional information acquisition unit 110, a snapshot selection unit 111, a registration unit 112, and a boot-up processing unit 113.

When the vehicle mounted device 10 has detected a stop (when stopping of the engine of the vehicle A is detected or when a stop command is input to the vehicle mounted device 10 from the vehicle A), the positional information acquisition unit 110 acquires current positional information of the vehicle A based on positioning information.

The snapshot selection unit 111 selects one of a plurality of prepared snapshots on the basis of the acquired current positional information.

Figure 3:
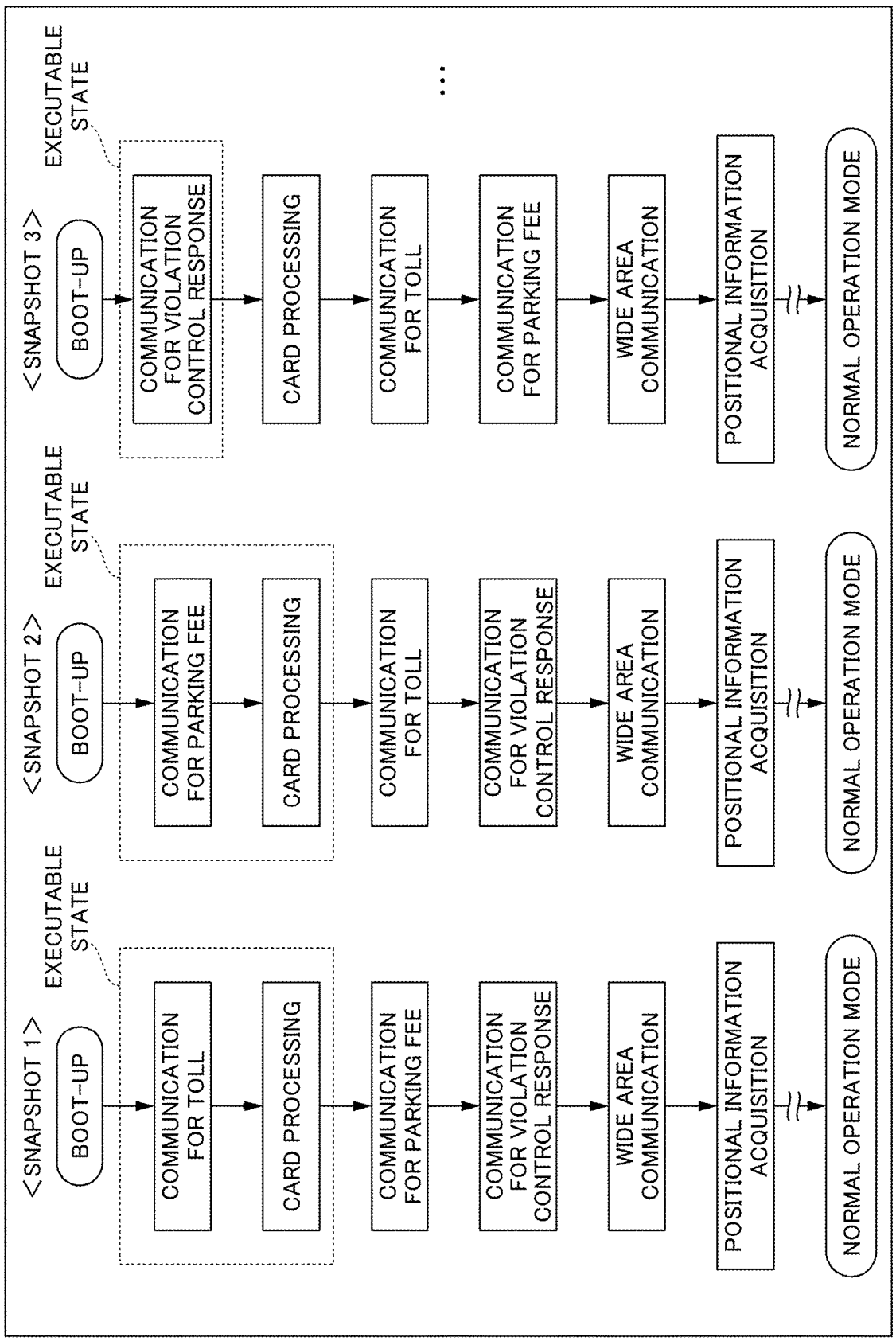
FIG. 3 is a diagram which shows an example of a snapshot according to the embodiment of the present invention.

FIG. 3 is a diagram which shows an example of a snapshot according to the embodiment of the present invention.

The snapshot is a captured memory image of the main storage device 12 of the vehicle mounted device 10. The snapshot according to the present invention is obtained by packaging a state in which only minimum required functions of the vehicle mounted device 10 are executable.

The minimum required functions are functions with high priorities to be executed at the current position of the vehicle A among the plurality of functions of the vehicle mounted device 10. The functions with high priorities are functions that need to be preferentially operated even when the vehicle mounted device 10 is powered off, and include, for example, functions for ensuring safety of the vehicle mounted device 10 (functions to detect abnormal conditions, and the like).

In addition, among the plurality of functions of the vehicle mounted device 10, a function that has a high possibility to be executed at the current position of the vehicle A is given a higher priority than other functions. Since the priority of each of the plurality of functions differs depending on the current position of the vehicle A, a plurality of snapshots in accordance with various priority patterns are prepared. For example, the plurality of snapshots 1, 2, 3. . . , and so forth are prepared in advance as shown in FIG. 3 in the present embodiment.

A "snapshot 1" is a memory image recorded in a state in which only a "communication task for a toll" and a "card processing task" that configure a "toll payment function" are executable among the plurality of functions (tasks) to be executed by the vehicle mounted device 10. The executable state indicates a state in which settings related to each function (such as wireless communication settings, and the like), data (such as a toll table for calculating a toll, and the like), and the like are read from the main storage device 12 and a function related to a toll payment can be immediately executed. Note that functions (tasks) other than the "toll payment function" take time for reading and the like of settings and data (a toll table for calculating parking fees, map data for acquiring positional information, and the like), and thus are in a state in which the execution preparation thereof has not been completed (uninitialized) in the snapshot 1.

A "snapshot 2" is a memory image recorded in a state in which only a "communication task for a parking fee" and the "card processing task" that configure a "parking fee payment function" are executable. Note that functions (tasks) other than the "parking fee payment function" are in a state in which the execution preparation thereof has not been completed.

A "snapshot 3" is a memory image recorded in a state in which only "communication for violation control response" that configures a "violation control response function" is executable. Note that functions (tasks) other than the "violation control response function" are in a state in which the execution preparation thereof has not been completed.

In addition, although not shown, a "snapshot 4" recorded in a state in which all tasks are executable may be further prepared. Moreover, other snapshots may be further prepared according to the functions of the vehicle mounted device 10.

Note that it is assumed that each of the snapshots described above also includes a boot-up sequence of the vehicle mounted device 10, and functions (tasks) other than those whose execution preparation has been completed are sequentially initialized in an executable state on the basis of the boot-up sequence.

FIG. 4 is a diagram which shows an example of a snapshot table according to the embodiment of the present invention.

The snapshot table 130 shown in FIG. 4 is stored in the auxiliary storage device 13 in advance. The snapshot table 130 stores a "target area" and a "priority" in association with each of the plurality of snapshots.

The "target area" is information indicating a place (a point or range) at which a specific function of the vehicle mounted device 10 has a high possibility to be executed, and is associated with a snapshot indicating a state in which the execution preparation of the function is completed. For example, an "area 1 (the vicinity of a road charging area)" at which the "toll payment function" has a high possibility to be executed is associated with the "snapshot 1." An "area 2 (a parking lot)" at which the "parking fee payment function" has a high possibility to be executed is associated with the "snapshot 2." An "area 3 (a roadside zone or parking prohibited area)" at which the "violation control response function" has a high possibility to be executed is associated with the "snapshot 3." In addition, an "area 4 (another)" indicating a place other than the areas 1 to 3 is associated with the "snapshot 4."

As described above, the snapshots according to the present embodiment are memory images recorded in a state in which only minimum function that has a high possibility to be executed at each area is executable.

The "priority" is information indicating which snapshot is to be preferentially selected when the current position of the vehicle A corresponds to a plurality of target areas. A smaller number of the priority indicates a higher priority. Note that the priority in FIG. 4 is an example, and the priority may be changed according to various requirements.

The registration unit 112 registers the selected snapshot as a snapshot to be read upon the next boot-up (a snapshot for boot-up 131). Note that the snapshot for boot-up 131 is stored in the auxiliary storage device 13.

The boot-up processing unit 113 reads the snapshot for boot-up 131 from the auxiliary storage device 13 when the vehicle mounted device 10 is booted to load it into the main storage device 12. As a result, the vehicle mounted device 10 is booted in a state in which execution preparation of only a predetermined function among the plurality of functions (tasks) is completed.

The main storage device 12 is, for example, a random access memory (RAM), and is a volatile memory which is used as a work area of the CPU 11.

The auxiliary storage device 13 is a non-volatile memory (a tangible medium that is not temporary) such as a magnetic disk, a magneto-optical disc, a CD-ROM, a DVD-ROM, or a semiconductor memory. The auxiliary storage device 13 stores an operation system (OS), a program, various types of data, and the like of the vehicle mounted device 10. In addition, the auxiliary storage device 13 stores a "snapshot table 130 in which a plurality of snapshots are registered (FIG. 4)," and the "snapshot for boot-up 131" to be read upon the next boot-up.

Processing Flow of Vehicle Mounted Device

Figure 5:
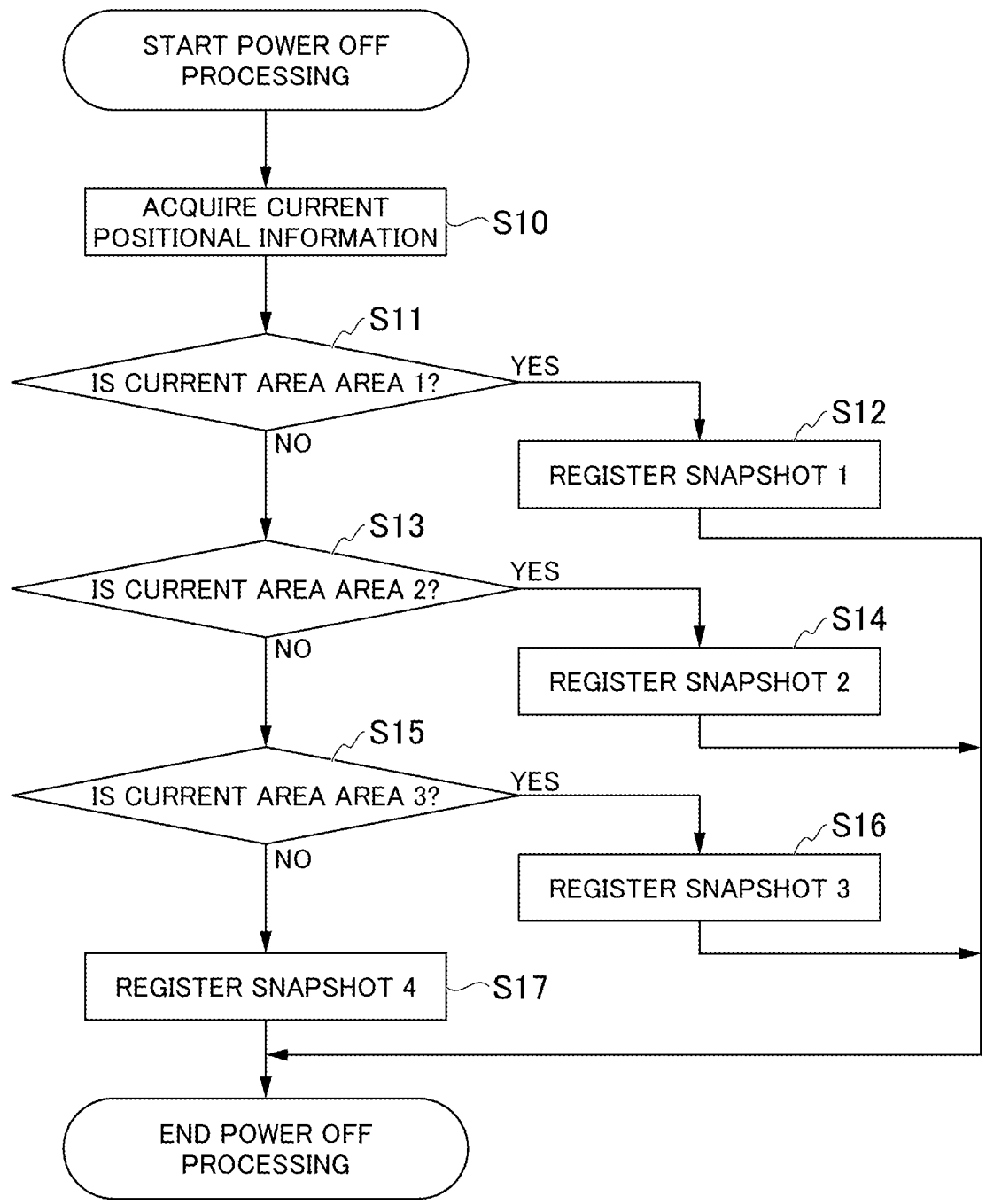
FIG. 5 is a flowchart which shows an example of power-off processing of the vehicle mounted device according to the embodiment of the present invention.

FIG. 5 is a flowchart which shows an example of power-off processing of the vehicle mounted device according to the embodiment of the present invention.

In the following description, an example of the power-off processing of the vehicle mounted device 10 will be described with reference to FIG. 5.

When the stopping of the engine of the vehicle A is detected, or when a stop command is input to the vehicle mounted device 10 from the vehicle A, the vehicle mounted device 10 executes the power-off processing shown in FIG. 5.

In the power-off processing, first, the positional information acquisition unit 110 acquires "current positional information" indicating a current position of the vehicle A (step S10).

At this time, the positional information acquisition unit 110 identifies and acquires the current positional information (latitude, longitude) of the vehicle A on the basis of information (satellite signals, and the like) acquired using a technology such as a global navigation satellite system (GNSS) or the like.

Next, the snapshot selection unit 111 identifies an area (hereinafter referred to as a "current area") in which the vehicle A is positioned on the basis of the current positional information and map information stored in the main storage device 12 in advance. Then, the snapshot selection unit 111 determines whether the current area is an "area 1" (the vicinity of a road charging area)" by referring to the snapshot table 130 (FIG. 4) (step S11).

The snapshot selection unit 111 selects a "snapshot 1" associated with the "area 1" when the current area is the "area 1" (YES in step S11). Then, the registration unit 112 registers the selected "snapshot 1" as the snapshot for boot-up 131 (step S12). At this time, the registration unit 112 copies the "snapshot 1" in a storage region of the snapshot for boot-up 131 and renames a file name to a file name defined in advance as the snapshot for boot-up 131.

Once the registration unit 112 completes processing (copying and renaming) of registering the "snapshot 1" as the snapshot for boot-up 131, it ends the power-off processing and the vehicle mounted device 10 is powered off.

In addition, when the current area is not the "area 1" (NO in step S11), the snapshot selection unit 111 determines whether the current area is an "area 2 (a parking lot)" by referring to the snapshot table 130 (step S13).

When the current area is the "area 2" (YES in step S13), the snapshot selection unit 111 selects a "snapshot 2" associated with the "area 2." Then, the registration unit 112 registers the selected "snapshot 2" as the snapshot for boot-up 131 (step S14).

Once the registration unit 112 completes processing (copying and renaming) of registering the "snapshot 2" as the snapshot for boot-up 131, it ends the power-off processing and the vehicle mounted device 10 is powered off.

In addition, when the current area is not the "area 2" (NO in step S13), the snapshot selection unit 111 determines whether the current area is an "area 3 (a roadside zone or a parking prohibited area)" by referring to the snapshot table 130 (step S15).

When the current area is the "area 3" (YES in step S15), the snapshot selection unit 111 selects a "snapshot 3" associated with the "area 3." Then, the registration unit 112 registers the selected "snapshot 3" as the snapshot for boot-up 131 (step S16).

Once the registration unit 112 completes processing (copying and renaming) of registering the "snapshot 3" as the snapshot for boot-up 131, it ends the power-off processing and the vehicle mounted device 10 is powered off.

In addition, when the current area is not any of the areas 1 to 3 (NO in step S15), the snapshot selection unit 111 selects a "snapshot 4" associated with an "area 4" indicating another area. Then, the registration unit 112 registers the selected "snapshot 4" as the snapshot for boot-up 131 (step S17).

Once the registration unit 112 completes processing (copying and renaming) of registering the "snapshot 4" as the snapshot for boot-up 131, it ends the power-off processing and the vehicle mounted device 10 is powered off.

Note that, although not shown in FIG. 5, the snapshot selection unit 111 may change a processing order in accordance with the "priority" of the snapshot table 130. That is, the snapshot selection unit 111 first determines whether the current area is an area (an area with a "priority: 1") associated with a highest "priority." Then, when the current area is not the highest priority area, the snapshot selection unit 111 selects an area (an area with a "priority: 2") with a next highest priority and performs the determination. In this manner, the snapshot selection unit 111 can select an appropriate snapshot in accordance with the priority even though the current area corresponds to a plurality of areas.

Figure 6:
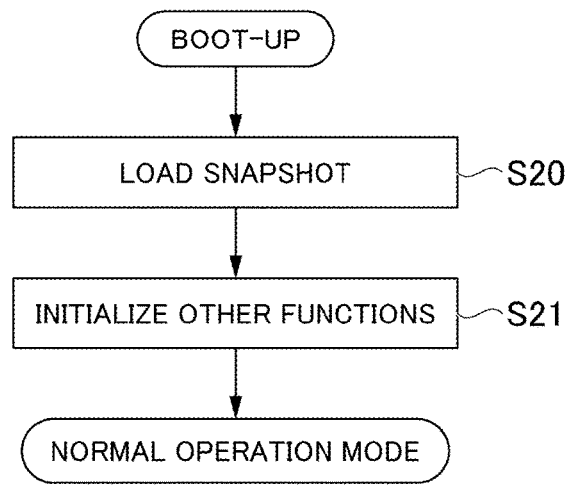
FIG. 6 is a flowchart which shows an example of boot-up processing of the vehicle mounted device according to the embodiment of the present invention.

FIG. 6 is a flowchart which shows an example of boot-up processing of the vehicle mounted device according to the embodiment of the present invention.

In the following description, an example of the boot-up processing of the vehicle mounted device 10 will be described with reference to FIG. 6.

If a boot-up command is input to the vehicle mounted device 10 according to the starting of the engine or the communication start request from the violation control system, the boot-up processing unit 113 reads the "snapshot for boot-up 131" stored in the auxiliary storage device 13 and loads it into the main storage device 12 (step S20).

Then, the vehicle mounted device 10 is booted in a state in which execution preparation of a predetermined function (task) is completed on the basis of a snapshot registered as the snapshot for boot-up 131.

Next, the boot-up processing unit 113 sequentially initializes other functions (tasks) for which execution preparation is not completed such that the functions can be executed on the basis of a boot-up sequence included in the snapshot for boot-up 131 (step S21). Once the vehicle mounted device 10 completes initialization of all other functions, the vehicle mounted device 10 transitions to a normal operation mode.

Figure 7:
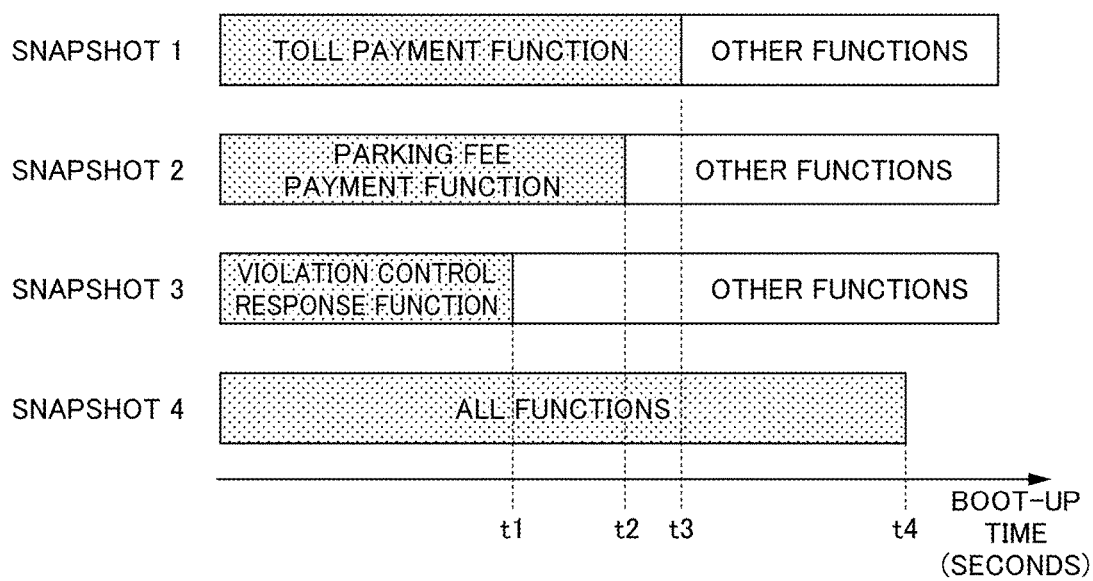
FIG. 7 is a diagram which shows an example of a boot-up time of the vehicle mounted device according to the embodiment of the present invention.

FIG. 7 is a diagram which shows an example of a boot-up time of the vehicle mounted device according to the embodiment of the present invention. As shown in FIG. 7, the boot-up time changes depending on which of the snapshots 1 to 4 is registered as the snapshot for boot-up 131. Shaded portions of FIG. 7 indicate functions that are booted in an executable state (booted at a high speed), and non-shaded portions indicate functions that are booted in a state in which execution preparation is not completed (an uninitialized state).

As described above, only minimum required functions are recorded in an executable state for each area in the snapshots 1 to 3. For this reason, the snapshots 1 to 3 have a smaller capacity than the snapshot 4 recorded in a state in which all functions are executable. Therefore, as shown in FIG. 7, times (t1, t2, and t3) at which the boot-up processing unit 113 reads the snapshots 1, 2, and 3 are shorter than a time (t4) at which the boot-up processing unit 113 reads the snapshot 4.

For this reason, for example, even if the engine of the vehicle A is started in the area 1 (near the road charging area) and the vehicle has immediately moved to a tollgate (in the road charging area), the execution preparation of the "toll payment function" is not completed in time, and thereby it is possible to reduce a possibility of toll payment processing failing.

Therefore, the vehicle mounted device 10 loads a snapshot stored in advance in accordance with an area in which the vehicle A is positioned as shown in step S20 (FIG. 6) described above at the time of boot-up, and thereby function that has a high possibility to be immediately used in the area can be made available within a short period of time.

Effect

As described above, the vehicle mounted device 10 according to the present embodiment includes the positional information acquisition unit 110 that acquires current positional information when a stop is detected, the snapshot selection unit 111 that selects one of the plurality of snapshots recorded in a state in which a part of functions is executable on the basis of the acquired current positional information, and the registration unit 112 that registers the selected snapshot as the snapshot for boot-up 131 to read upon the next boot-up.

For example, when the vehicle has stopped near the road charging area, it may pass through the road charging area immediately after the engine starts. In addition, while the vehicle is stopped (while the engine is stopped) in the roadside zone, the patrol vehicle A0 may pass nearby and make a response to the violation control system. As described above, the vehicle mounted device 10 may be required to be immediately booted upon the next boot-up according to the current position of the vehicle A. In such a case, the vehicle mounted device 10 according to the present embodiment can select and register a small-capacity snapshot recorded in a state in which only a part of functions is executable among the plurality of snapshots. As a result, the vehicle mounted device 10 can be booted only by reading the small-capacity snapshot upon the next boot-up, and thus the boot-up time can be shortened as compared to when it is booted in a state in which all functions are executable.

In addition, each of the plurality of snapshots is associated with a different area, and is recorded in a state in which functions with high priorities to be executed in an area among the plurality of functions are executable, and the snapshot selection unit 111 selects a snapshot associated with an area including the current positional information.

In this manner, the vehicle mounted device 10 can be booted in a state in which only minimum required functions with high priorities to be executed at the current position are executable by reading the registered snapshot. As a result, the vehicle mounted device can shorten the boot-up time because the execution preparation of functions with low priorities to be executed at the current position can be postponed.

Moreover, among the plurality of functions, a function that has a high possibility to be executed in an area is given a higher priority than other functions.

In this manner, since the vehicle mounted device 10 is booted in a state in which minimum required function that has a high possibility to be executed at the current position is executable, and the execution preparation of functions that have a low possibility to be executed at the current position can be delayed, it is possible to further shorten the boot-up time.

In addition, the plurality of snapshots are given different priorities in advance, and the snapshot selection unit 111 selects a snapshot on the basis of a priority when the current positional information is included in a plurality of areas.

In this manner, the snapshot selection unit 111 can select an appropriate snapshot in accordance with a priority even when the current positional information is included in the plurality of areas. As a result, it is possible to reduce the possibility of processing of functions with high priorities failing.

An embodiment of the present invention has been described above, but the present invention is not limited thereto, and some design changes can also be made as long as they do not depart from the technical concepts of the present invention.

For example, in the embodiment described above, an example has been described in which a memory image recorded as the snapshot 4 in a state in which all functions are executable is prepared in advance, but the present invention is not limited thereto. In another embodiment, the vehicle mounted device 10 may be booted while initializing all functions without reading a snapshot in the area 4 (the other areas) that does not correspond to the areas 1 to 3.

In addition, an aspect in which the snapshot selection unit 111 selects a snapshot with a high priority when the current positional information is included in the plurality of areas has been described in the embodiment described above, but the present invention is not limited thereto. In another embodiment, the snapshot selection unit 111 may register the plurality of snapshots as snapshots for boot-up 131. In this case, the boot-up processing unit 113 may determine which of the snapshots for boot-up 131 to read on the basis of a boot-up command (the starting of the engine or a communication start request from the violation control system) input to the vehicle mounted device 10. For example, when the snapshot 1 and the snapshot 3 are registered as the snapshots for boot-up 131, the boot-up processing unit reads the snapshot 1 when a boot-up command due to the starting of the engine is input, and reads the snapshot 3 when a boot-up command due to a communication start request from the violation control system is input.

In this manner, since a snapshot (snapshot 3) including only a function actually requested to be executed (for example, the "violation control response function") is read at the time of the boot-up of the vehicle mounted device 10, the execution preparation of the function is delayed and it is possible to further reduce a possibility of the processing failing.

Moreover, an aspect has been described in which the vehicle mounted device 10 according to the embodiment described above has the "toll payment function" for paying a usage fee of a road charging area such as a toll road (a toll), the "parking fee payment function" for paying a usage fee of a parking lot (a parking fee), and the "violation control response function" for responding to the violation control system, but the present invention is not limited thereto. In another embodiment, the vehicle mounted device 10 may further have another function.

For example, there is an operation management system that collects traveling information (positional information, speed, acceleration, angular speed, and the like) of a vehicle from the vehicle mounted device via the roadside communication device, and evaluates and manages operations of the vehicle on the basis of the traveling information. For this reason, the vehicle mounted device 10 may further include a "traveling information transmission function" for transmitting the traveling information of the vehicle A to the operation management system in another embodiment. The vehicle mounted device 10 performs wireless communication with a wireless communication device of the operation management system installed on a roadside, and thereby transmits the "traveling information (positional information, speed, acceleration, angular speed, and the like) of the vehicle A as the "traveling information transmission function." In addition, the traveling information transmission function includes at least a "communication task for traveling information transmission" of performing communication with the wireless communication device.

In a conventional system, when the engine of a vehicle is stopped near a roadside communication device of the operation management system, if the engine is started again and the vehicle immediately starts moving, the vehicle may leave the communication region of the roadside communication device before the vehicle mounted device 10 is booted to make various types of processing executable, and the traveling information may not be transmitted normally.

However, when the vehicle mounted device 10 according to the present invention is powered off in the vicinity of the wireless communication device of the operation management system, a snapshot associated with an area indicating the vicinity of the wireless communication device (a snapshot stored in a state in which the communication task for traveling information transmission is executable) is registered as the snapshot for boot-up 131. As a result, the next time the vehicle mounted device 10 is booted, since the traveling information transmission function becomes executable immediately, even when the vehicle has started to move immediately after the boot-up, it is possible to reduce the possibility of transmission of the traveling information of the vehicle A failing.

INDUSTRIAL APPLICABILITY

According to the vehicle mounted device, the control method, and the program described above, it is possible to shorten the boot-up time.

REFERENCE SIGNS LIST

10 Vehicle mounted device
11 CPU
110 Positional information acquisition unit
111 Snapshot selection unit
112 Registration unit
113 Boot-up processing unit
12 Main storage device
13 Auxiliary storage device
130 Snapshot table
131 Snapshot for boot-up

The invention claimed is:
1. A vehicle mounted device comprising:
a CPU;
a main storage device; and
an auxiliary storage device configured to store a plurality of snapshots each of which is a memory image of the main storage device captured at a state in which a part of a plurality of functions is executable,
wherein the CPU is configured to:
acquire current positional information on the basis of a satellite signal obtained from a satellite of a global navigation satellite system when the vehicle mounted device detects a stopping of an engine of a vehicle on which the vehicle mounted device is installed or a stop command is input to the vehicle mounted device;
select one of the plurality of snapshots stored in the auxiliary storage device on the basis of the acquired current positional information; and register the selected snapshot to the auxiliary storage device as a snapshot to be read and loaded into the main storage device upon a next boot-up.

2. The vehicle mounted device according to claim 1, wherein each of the plurality of snapshots is associated with a different area, and is recorded in a state in which functions with high priorities to be executed in the area are executable among the plurality of functions, and the CPU is configured to select a snapshot associated with an area including the current positional information.

3. The vehicle mounted device according to claim 2, wherein a function that has a high possibility to be executed in the area among the plurality of functions is set with a higher priority than other functions.

4. The vehicle mounted device according to claim 2, wherein the plurality of snapshots is set with different priorities in advance, and the CPU is configured to select a snapshot on the basis of the priority when the current positional information is included in a plurality of areas.

5. A control method of a vehicle mounted device that includes a CPU, a main storage device, and an auxiliary storage device configured to store a plurality of snapshots each of which is a memory image of the main storage device captured at a state in which a part of a plurality of functions is executable, the method executed by the CPU comprising:

a positional information acquisition step of acquiring current positional information on the basis of a satellite signal obtained from a satellite of a global navigation satellite system when the vehicle mounted device detects a stopping of an engine of a vehicle on which the vehicle mounted device is installed or a stop command is input to the vehicle mounted device;

a snapshot selection step of selecting one of the plurality of snapshots stored in the auxiliary storage device on the basis of the acquired current positional information; and a registration step of registering the selected snapshot to the auxiliary storage device as a snapshot to be read and loaded into the main storage device upon the next boot-up.

6. A non-transitory computer readable medium recording a program of a computer of a vehicle mounted device that includes a CPU, a main storage device, and an auxiliary storage device configured to store a plurality of snapshots each of which is a memory image of the main storage device captured at a state in which a part of a plurality of functions is executable, the program causing the computer to execute:

a positional information acquisition step of acquiring current positional information on the basis of a satellite signal obtained from a satellite of a global navigation satellite system when the vehicle mounted device detects a stopping of an engine of a vehicle on which the vehicle mounted device is installed or a stop command is input to the vehicle mounted device;

a snapshot selection step of selecting one of the plurality of snapshots stored in the auxiliary storage device on the basis of the acquired current positional information; and a registration step of registering the selected snapshot to the auxiliary storage device as a snapshot to be read and loaded into the main storage device upon the next boot-up.

* * * * *